JAMES S. UPTON.
Improvement in Car-Wheel and Axle.
No. 127,661. Patented June 4, 1872.
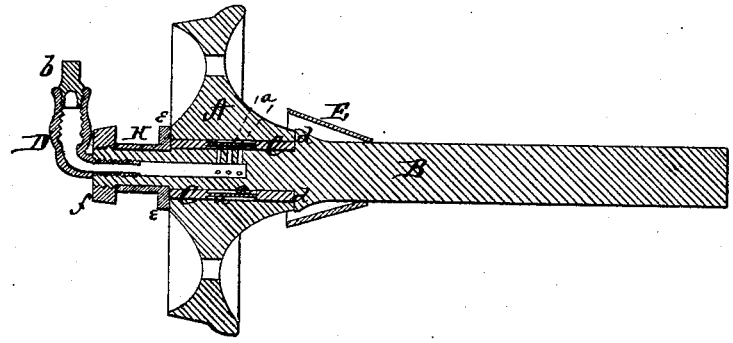
Witnesses:
Inventor

UNITED STATES PATENT OFFICE.

JAMES S. UPTON, OF BATTLE CREEK, MICHIGAN.

IMPROVEMENT IN CAR WHEELS AND AXLES.

Specification forming part of Letters Patent No. 127,661, dated June 4, 1872.

*To all whom it may concern:*

Be it known that I, JAMES S. UPTON, of Battle Creek, in the county of Calhoun and in the State of Michigan, have invented certain new and useful Improvements in Car Wheel and Axle; and do hereby declare that the following is a full, clear, and exact description thereof, reference being had to the accompanying drawing and to the letters of reference marked thereon making a part of this specification.

The nature of my invention consists in the construction and arrangement of a car wheel and axle, as will be hereinafter more fully set forth.

In order to enable others skilled in the art to which my invention appertains to make and use the same, I will now proceed to describe its construction and operation, referring to the annexed drawing, which represents a longitudinal vertical section of my car wheel and axle.

A represents the car-wheel, and B the axle upon which it revolves. Upon the axle B is placed a loose steel cylinder or thimble, C, and the wheel A is placed upon said cylinder or thimble, the said three parts being so arranged that the thimble will revolve both on the axle and in the center of the wheel, thus dividing the friction equally between the axle and the wheel. The cylinder or thimble C is provided with both an exterior and an interior central circumferential groove, a, which grooves form oil-passages and at the same time reduce the friction, as by them the surfaces in contact with each other are diminished without impairing or lessening the strength of either wheel or axle. The end of the axle B is hollow, as shown, and in the extreme end is screwed an oil-cup, D, provided with a screw-plug, b. The oil from the cup D passes through and fills the hollow part of the axle, and thence through openings i into the interior groove a on the thimble; then through corresponding openings in said thimble to the exterior groove, oiling said thimble both on the inside and outside, the axle, and the wheel. The hub of the wheel A is elongated, as shown, extending inward for a suitable distance on the axle, and resting against a shoulder, d, on the same. The joint at this point is protected by means of a conical-shaped cap, E, attached to the axle and surrounding the inner end of the hub of the wheel, preventing dirt, &c., from entering between the wheel, thimble, and axle. Upon the extreme end of the axle, outside of the wheel, is a square sleeve, H, provided with a flange, e, at its inner end bearing against the outer end of the thimble C and the hub of the wheel, said sleeve being then fastened by a nut, f. The oil-cup D is afterward screwed into the end of the axle.

If desired, the axle may be made to revolve just as well as to remain stationary.

Having thus fully described my invention, what I claim as new, and desire to secure by Letters Patent, is—

1. The loose steel cylinder or thimble C, provided with an interior and an exterior central circumferential groove, and with suitable holes or openings forming communications between said interior and exterior grooves, substantially as and for the purposes herein set forth.

2. The combination of the hollow axle B with oil-passages i, oil-cup D, loose thimble C with grooves and openings, as described, and the wheel A, all constructed and arranged substantially as and for the purposes herein set forth.

In testimony that I claim the foregoing I have hereunto set my hand this 30th day of January, 1872.

JAMES S. UPTON.

Witnesses:
KELLOGG B. FINLEY,
HENRY M. STRONG.